(12) United States Patent
Kolczyk et al.

(10) Patent No.: US 10,456,716 B2
(45) Date of Patent: Oct. 29, 2019

(54) LIQUID FILTERING DEVICE

(71) Applicant: MANN+HUMMEL GMBH, Ludwigsburg (DE)

(72) Inventors: Markus Kolczyk, Mundelsheim (DE); Rainer Loos, Freiberg (DE); Daniel Lucas, Stuttgart (DE); Sven Epli, Heilbronn (DE); Herbert Jainek, Heilbronn (DE); Ralf Blum, Aham (DE); Joerg Kramer, Hechingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 451 days.

(21) Appl. No.: 14/324,595

(22) Filed: Jul. 7, 2014

(65) Prior Publication Data

US 2014/0311965 A1 Oct. 23, 2014

Related U.S. Application Data

(63) Continuation of application No. 11/993,573, filed as application No. PCT/EP2006/063462 on Jun. 22, 2006, now abandoned.

(30) Foreign Application Priority Data

Jun. 30, 2005 (DE) .................... 20 2005 010 445 U

(51) Int. Cl.
*B01D 29/21* (2006.01)
*B01D 35/16* (2006.01)
*B01D 35/153* (2006.01)
*B01D 29/23* (2006.01)
*B01D 35/147* (2006.01)
*F01M 11/03* (2006.01)
*F01M 1/10* (2006.01)

(52) U.S. Cl.
CPC .......... *B01D 29/21* (2013.01); *B01D 29/232* (2013.01); *B01D 35/147* (2013.01); *B01D 35/153* (2013.01); *B01D 35/16* (2013.01); *F01M 11/03* (2013.01); *B01D 2201/167* (2013.01); *B01D 2201/295* (2013.01); *B01D 2201/305* (2013.01); *B01D 2201/34* (2013.01); *F01M 2001/1064* (2013.01)

(58) Field of Classification Search
None
See application file for complete search history.

(56) References Cited

U.S. PATENT DOCUMENTS 3,855,128 A * 12/1974 Shaltz .................... B01D 27/08
210/130
6,159,261 A * 12/2000 Binder ............... B01D 46/2411
55/498
6,585,894 B1 * 7/2003 Gebert .................. B01D 29/111
210/493.2

(Continued)

*Primary Examiner* — Benjamin M Kurtz
(74) *Attorney, Agent, or Firm* — James Hasselbeck

(57) ABSTRACT

A filter arrangement for liquids has a filter housing and a functional carrier arranged inside the filter housing. A cylindrical filter element is inserted axially into the filter housing and defines an unfiltered side and a filtered side inside the filter housing. A non-return diaphragm is secured within the filter housing, wherein the non-return diaphragm is arranged on the functional carrier so as to effect an axial and/or radial sealing action of the unfiltered side relative to the filtered side of the filter arrangement.

3 Claims, 9 Drawing Sheets

(56) References Cited

U.S. PATENT DOCUMENTS

| | | | |
|---|---|---|---|
| 7,435,341 B2* | 10/2008 | Crawford | B01D 29/016 210/130 |
| 2002/0036165 A1* | 3/2002 | Sommer | B01D 46/2414 210/438 |
| 2006/0091061 A1* | 5/2006 | Brown | B01D 46/527 210/440 |

* cited by examiner

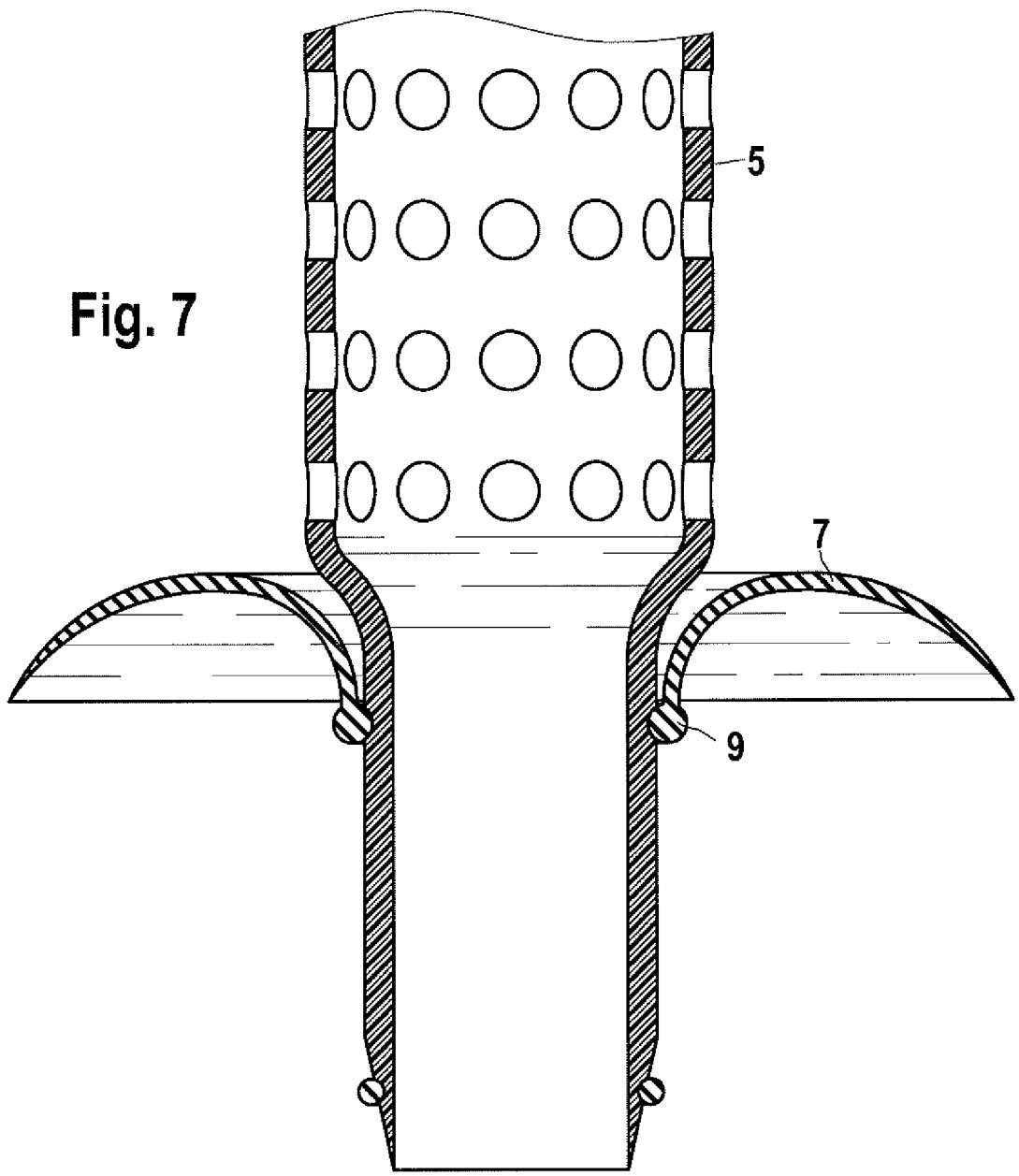

LIQUID FILTERING DEVICE

CROSS-REFERENCE TO RELATED APPLICATIONS

This application is a continuation of application Ser. No. 11/993,573, which is the National Stage of International Application No. PCT/EP2006/63462, filed Jun. 22, 2006, the contents of which are incorporated herein by reference in their entirety. Application Ser. No. 11/993,573 claims the benefit of German patent Application No. 20 2005 010 445.0, filed Jun. 30, 2005.

TECHNICAL FIELD

The invention relates to a filtering arrangement for liquids, in particular for oil or fuel of an internal combustion engine, according to the preamble of the independent claim.

BACKGROUND

Filter elements for liquid filtration of viscous media such as oil or fuel are produced in a conventional way from pleated filter media preferably in a cylindrical shape. These filter elements can be free of metal and can be provided with an end plate of film, cardboard, plastic material, for example, PA, or something similar. Embodiments with metal end plates and a central metal tube are possible also. In this connection, the pleats of the filter elements are often incorporated into the end plates, for example, glued, welded, or foamed, and directly connect these elements.

The embodiments comprising a central tube for receiving the filter elements are often designed such that a reciprocal sealing action of the unfiltered side and the filtered side in the flow of the medium to be filtered is realized by means of an O-ring that is pushed onto the central tube; the O-ring is then exchangeable during servicing.

It is disclosed, for example, in DE 100 46 494 A1 to employ a metal-free filter element in an oil filter for filtering oil of an internal combustion engine. This filter element is inserted into a housing and the housing is closed off by a lid. In the housing, for reducing oil return upon shut-down of the internal combustion engine, a non-return vale is usually provided. In this connection, at least one seal is arranged on the filter element such that it rests seal-tightly against a housing wall of the filter housing within a predetermined axial movement area.

For preventing the filter housing from draining completely in the tube direction, it is also customary to employ a spring-loaded valve that is permanently introduced into the housing. These non-return valves are inserted in a separate assembly step into the housing and the non-return valves are comprised usually of a valve plate that is pre-tensioned by a spring; a valve crown; and a valve seat. The valve is screwed into the housing or inserted, wherein, generally, it is disadvantageous that assembly of this module is complex.

For example, DE 42 40 656 C2 disclose a further filtering arrangement for fuel and/or lubricants of an internal combustion engine in which a bottom drainage is provided that is closed off by an end plate of the filter element upon insertion of the filter element. This drainage is opened as soon as the filter element is removed so that the oil can flow out through this drainage bore into a catch basin. Also known in the prior art is a non-return valve that is comprised of a metal plate that is loaded by a spring and that seals the supply bore for the unfiltered oil. In this connection, different valve components are required.

Moreover, U.S. Pat. No. 5,413,712 discloses a filter for liquids in which the end plates of the cylindrical filter element are made from plastic material that is connected to the filter element. As a non-return diaphragm, an additional radially sealing rubber diaphragm is provided that rests against the end plate and is inserted during assembly.

SUMMARY OF THE INVENTION

The invention has the object to further develop a filter arrangement according to the preamble of the independent claim in a simple way such that a non-return valve can be produced and mounted in the filter housing in a simple way.

The filter arrangement for liquids in accordance with the invention has according to the preamble a cylindrical filter element that is insertable axially into the filter housing, wherein the filter element after mounting effects closure of a return device for the unfiltered liquid that is to be filtered with at least one seal secured on the filter element acting as a non-return diaphragm. In an advantageous way, the filter arrangement according to the invention is designed such that the non-return diaphragm is mounted on a functional carrier of the filter arrangement in such a way that an axial and/or radial sealing action of the unfiltered side and filtered side of the filter arrangement is effected.

The liquids to be filtered can be, for example, fuel and/or lubricants for an internal combustion engine in a motor vehicle, but also water. Preferably, the non-return diaphragm can be mounted on an axial projection of the functional carrier in such a way that a flexible contact of the non-return diaphragm on the sealing surfaces of the filter arrangement results within axially predetermined limits.

In an especially advantageous way, the axial projection of the functional carrier is dimensioned such that by means of the projection, upon contacting a step of the filter housing, a stop is provided. By means of an advantageous size of the length of the projection, after insertion of the filter element and hitting the step, a predetermined pretension of the non-return diaphragm resting against the sealing surface can be effected by the remaining space allowing a flexible deformation of the diaphragm.

Moreover, according to another advantageous embodiment, the functional carrier can be an end plate that is fixedly connected to the filter element, wherein the non-return diaphragm is attached to the end plate and wherein the end plate is designed such that radial noses are provided on it that laterally engage matching recesses of the filter housing, wherein the recesses in this connection are also sized such that with the recesses when contacted by the radial noses a stop is formed so that by means of the remaining space a predetermined pretension can be generated when the diaphragm rests against the sealing surface of the filter housing.

With the aforementioned embodiment, correct mounting can be ensured because in this way it is made sure that the pretension of the non-return diaphragm is not too great, that the filter element as a result of the stop does not sag downwardly, and that an incorrectly mounted filter element is pushed onto its seal seat.

It can be especially advantageous when the functional carrier has a metal-free central tube fixedly connected to the filter element to which the non-return diaphragm is seal-tightly attached. On the central tube in a simple way a diaphragm, for example, made from elastomer, is mounted that prevents that the filter housing will run empty in certain mounting situations. The diaphragm is designed such that it acts as a radial or axial seal between the unfiltered and filtered sides with a corresponding projection of the filter housing. The non-return diaphragm is exchangeable in this embodiment and is exchanged together with the filter element.

According to another advantageous embodiment the functional carrier is a central tube that is metal-free and is mounted fixedly in the housing of the filter arrangement, wherein the non-return diaphragm is fixedly connected to the tube. In this connection, the embodiment of the central tube must however be such that the filter element can be removed in a direction toward the lid. For this purpose, the diaphragm must be made of a material, for example, an appropriate elastomer, that is permanent and matched to the service life of the vehicle. The material of the central tube can be selected within limits but should be completely incineratable so that in this connection in particular plastic materials such PA, PP, PE, POM, PUR or comparable materials are advantageous.

In an advantageous way, the functional carrier can also be an end plate that is fixedly connected to the filter element and to which the diaphragm is attached. However, in many applications it is also very advantageous when the functional support has an end plate that is connected by means of a snap-on connection to the filter element to which end plate the non-return diaphragm is attached. In this connection, when snapping on or axially pushing the end plate against the end faces of the filter element radial snap-on noses can engage laterally the intermediate spaces of the folded filter webs of the filter element above the axial glued connection of the filter webs and provide a detachable connection in this way. In this connection, elastomer extensions of the non-return diaphragm that are secured on the functional carrier can be clamped radially and/or axially between the functional carrier in the filter element for sealing purposes.

Such a component that is composed of the non-return diaphragm and the functional carrier can be pre-manufactured in a simple way independent of the filter element and can be attached by simple manipulations and optionally can also be removed once the filter element is mounted.

The non-return diaphragm in all afore described embodiments can be connected fixedly to the functional carrier by gluing, welding, or by means of a two-component method. Alternatively, a detachable connection of the non-return diaphragm with the functional carrier by coupling can be provided.

As a result of the space-saving embodiment of a valve as a non-return diaphragm in accordance with the invention, the filter housing can be very compact. The non-return diaphragm can be produced and mounted inexpensively and is therefore less expensive than a spring-loaded cup valve in accordance with the prior art. The non-return diaphragm according to the invention can be embodied as a shaped part and, in an advantageous way, can take over the sealing function of an O-ring as a seal for the otherwise required sealing action between the unfiltered side and filtered side of the filter arrangement so that this element can also be eliminated.

BRIEF DESCRIPTION OF THE DRAWINGS

Embodiments of the filter arrangement according to the invention will be explained with the aid of the Figures. It is shown in:

FIG. 7 a further schematic illustration of a non-return diaphragm that is mounted on an extended central tube for a filter element;

FIG. 9a is a schematic illustration of the embodiment of FIG. 9 having the axial stop radial noses of FIGS. 11 and 11a, the radial noses extending radially outwardly from the end plate as shown in FIGS. 11 and 11a;

FIG. 11a is a schematic illustration of the end plate with the radial noses of

FIG. 11 engaging a lateral recess of the housing.

DETAILED DESCRIPTION OF THE INVENTION

Figure 1:
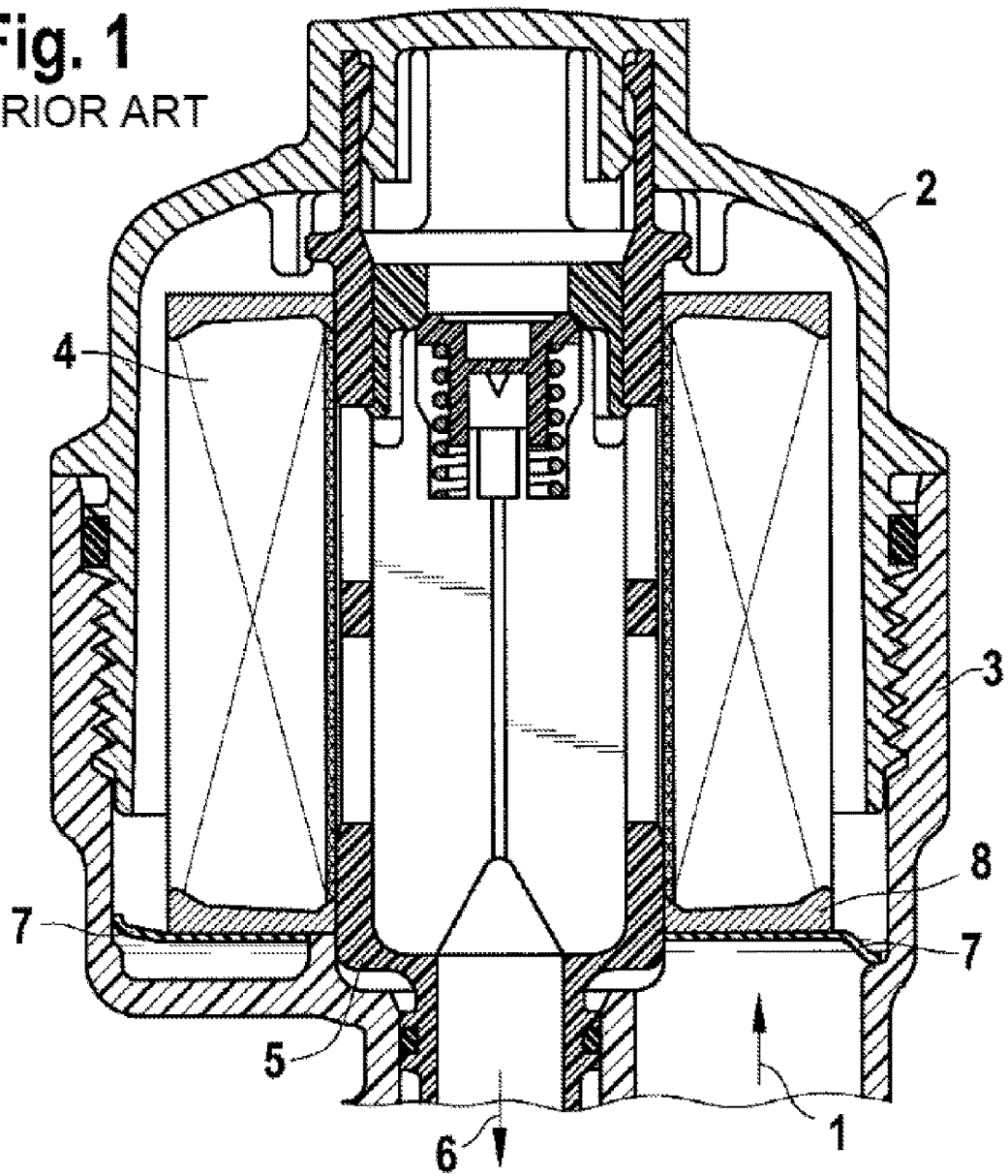
FIG. 1 a section of a basic configuration of a filter arrangement for liquids according to the prior art.

In FIG. 1 a filter arrangement is illustrated that, in principle, corresponds to a filter arrangement for fuel or lubricant for an internal combustion engine disclosed in the prior art reference DE 100 46 494 A1. The unfiltered liquid that is to be filtered flows through an inlet 1 into the filter housing that is comprised of a top part 2 and a bottom part 3. In the filter housing, a filter element 4 of zigzag-folded filter paper is arranged that is pushed onto a central tube 5 and is clamped fixedly upon joining the filter housing. The unfiltered liquid flows through the filter element 4 and exits at the filtered side through the central tube 5 and through the outlet 6.

Figure 2A:
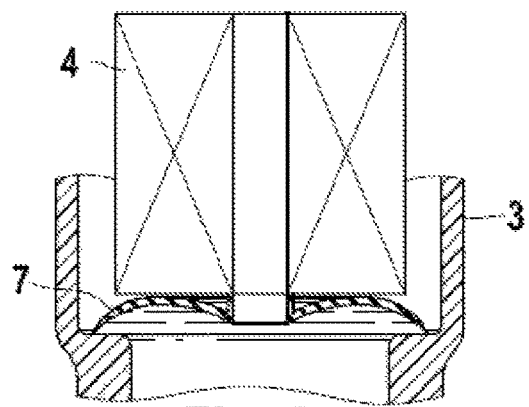
FIG. 2a a schematic illustration of a filter element for a filter arrangement according to FIG. 1 with a non-return diaphragm and an axial sealing action of the unfiltered side in the liquid flow.
Figure 2B:
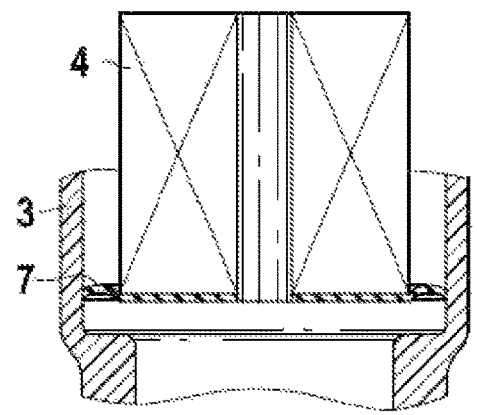
FIG. 2b a schematic illustration of a filter element for a filter arrangement according to FIG. 1 with a non-return diaphragm and a radial sealing action of the unfiltered side in the liquid flow.

A non-return diaphragm 7, for example, made of elastomer, is arranged on the end plate 8 of the filter element 4 and releases at the unfiltered side the liquid flow but upon interruption of the flow, for example, when the internal combustion engine is shut down, prevents return flow into the supply channel 1 as the diaphragm contacts axially or radially the filter housing. FIGS. 2a and 2b illustrate the principal mechanisms of the function of such non-return diaphragms 7; FIG. 2a shows an axial sealing action and FIG. 2b shows a radial sealing action.

Figure 3A:
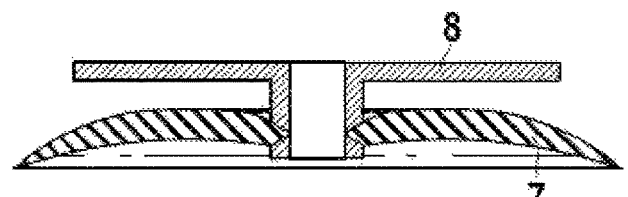
FIG. 3a a detail illustration of a radially sealing non-return diaphragm with a two-component attachment on an end plate of the filter element.
Figure 3B:
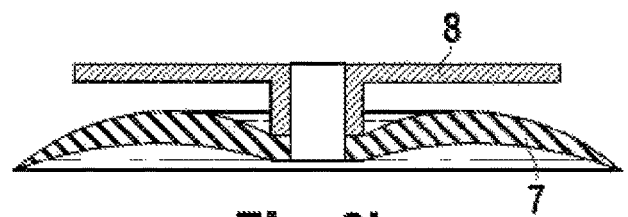
FIG. 3b a detail view of an axially sealing non-return diaphragm with a two-component attachment on an end plate of the filter element.
Figure 3C:
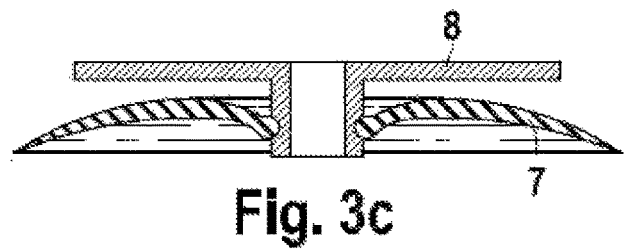
FIG. 3c a detail illustration of a radially sealing non-return diaphragm that is coupled to an end plate of the filter element.
Figure 3D:
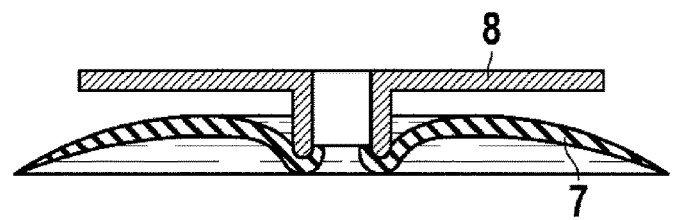
FIG. 3d a detail view of an axially sealing non-return diaphragm that is coupled to an end plate of the filter element.
Figure 3E:
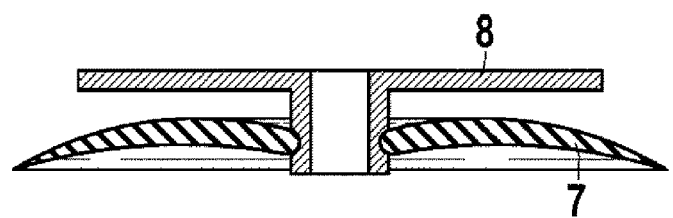
FIG. 3e a detail illustration of another embodiment of an axially sealing non-return diaphragm that is connected to an end plate of the filter element.

FIGS. 3a to 3e show respectively different embodiments of the non-return diaphragm 7 mounted on an end plate 8. The FIGS. 3a and 3b show non-return diaphragms 7 that are glued, welded or connected by a two-component method, and FIGS. 3c to 3e show non-return diaphragms 7 coupled to the end plate 8.

Figure 4:
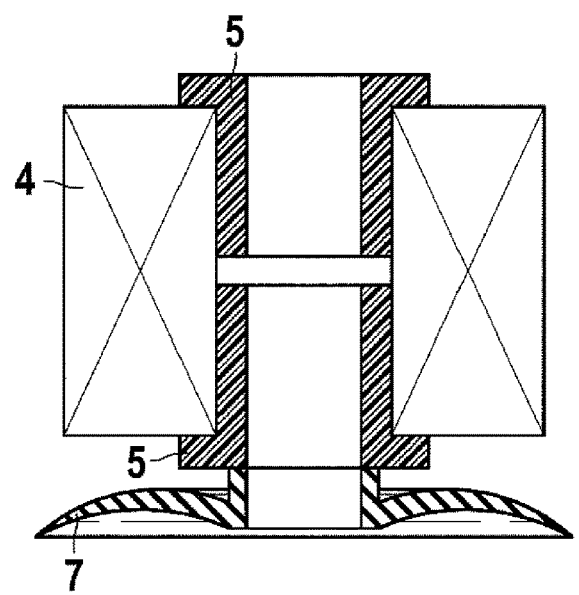
FIG. 4 a schematic illustration of an axially sealing non-return diaphragm that is mounted on a two-part snapped-on central tube for a filter element.
Figure 5:
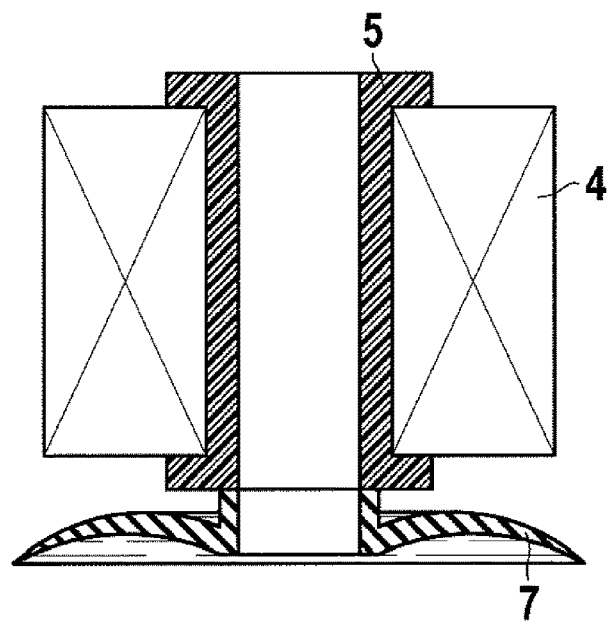
FIG. 5 a schematic illustration of an axially sealing non-return diaphragm that is mounted on a single-part central tube for a filter element.
Figure 6:
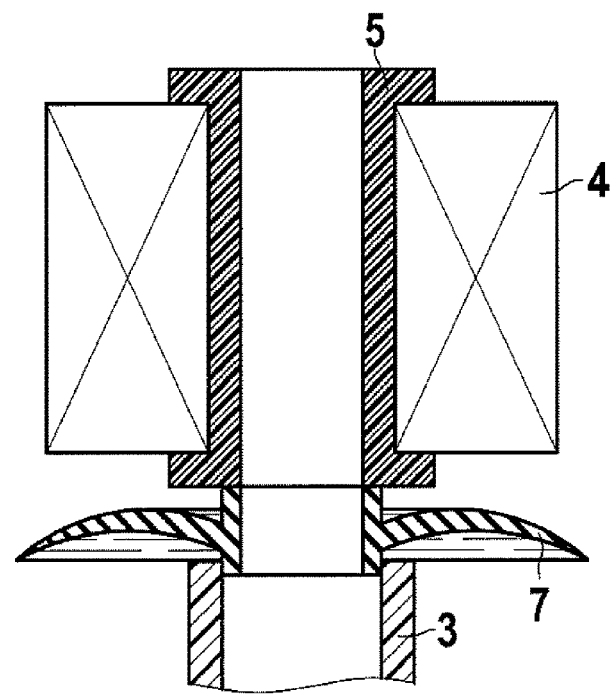
FIG. 6 a schematic illustration of a radially sealing non-return diaphragm that is mounted on a single-part central tube for a filter element.

FIG. 4 shows the attachment of the non-return diaphragm 7 on a two-part central tube 5, and FIG. 5 and FIG. 6 show, respectively, an attachment of the non-return diaphragm 7 on a single-part central tube 5.

Figure 8A:
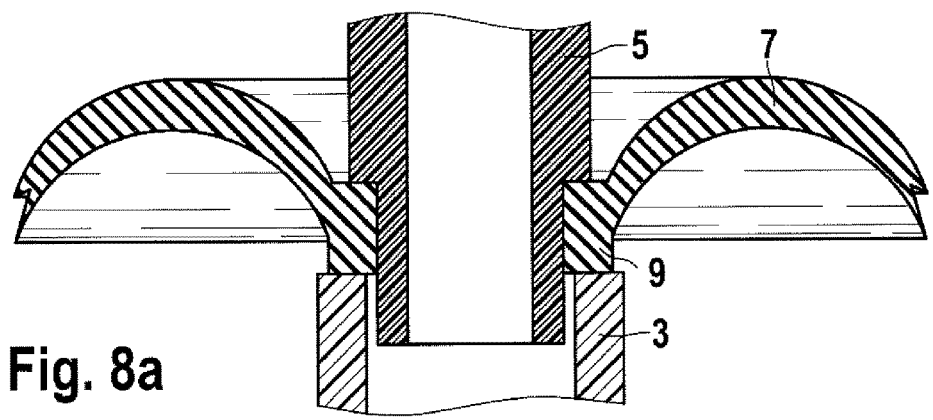
FIGS. 8a to 8c further embodiments of attachments of the non-return diaphragm on the central tube according to FIG. 7.
Figure 8B:
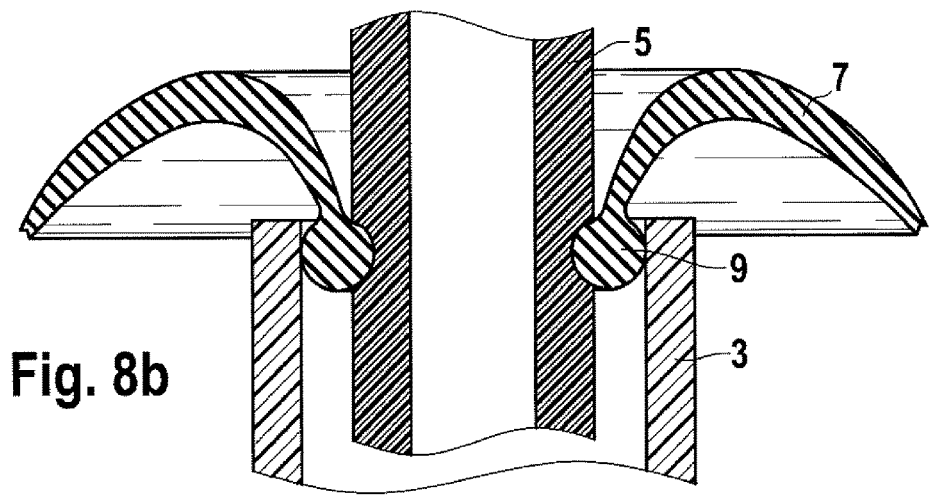
Figure 8C:
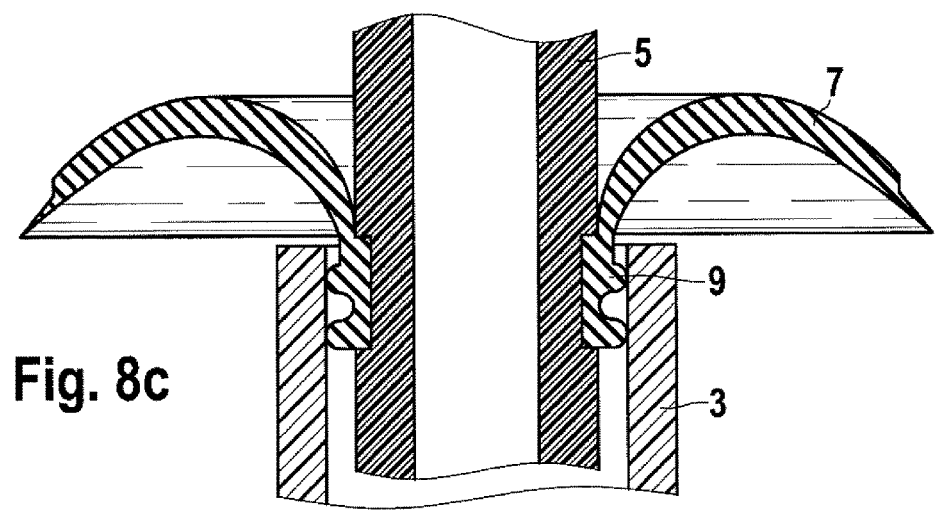

FIG. 7 shows an embodiment in which the non-return diaphragm 7 is attached to the central tube 5 in such a way that a sealing bead 9 results with which a radial sealing action between the central tube 5 and the bottom housing part 3 (compare FIG. 1) can be realized. FIG. 8a shows the possibility of an axial sealing action with the sealing bead 9, and FIGS. 8b and 8c show further sealing actions as a supplement to the arrangement according to FIG. 7.

Figure 9:
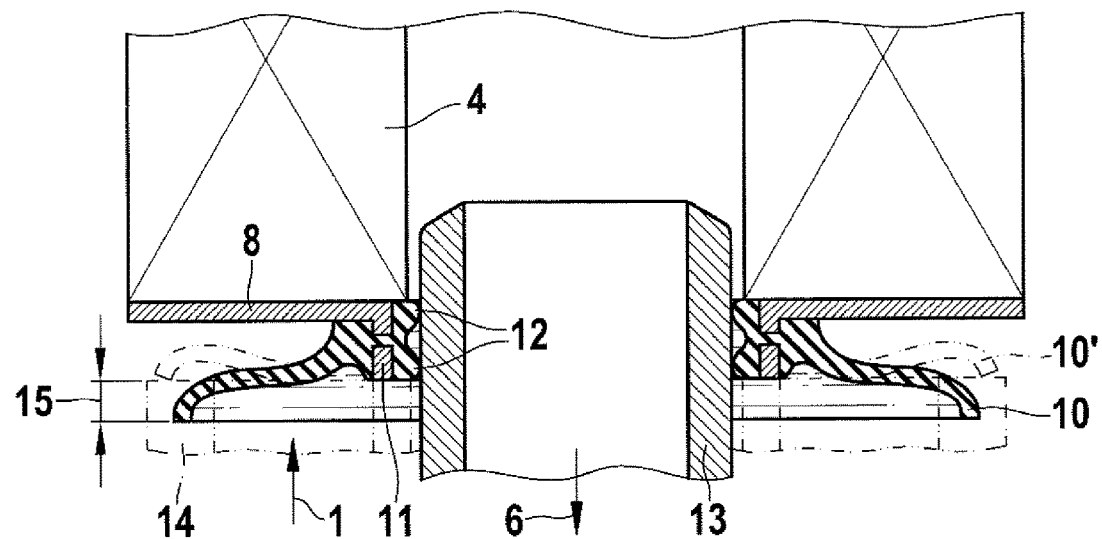
FIG. 9 an embodiment of an end plate on the filter element that has a stop for generating a defined pretension for the non-return diaphragm.

In FIG. 9, as a supplement to the illustrations of FIGS. 3a to 3c, it is shown that for an end plate 8 as a functional carrier a non-return diaphragm 10 can be attached to the end plate 9 and in particular to a projection in the form of an annular axial projection 11 of the end plate 8. This area of the end plate 8 is embedded by injection-molding with an elastomer for forming the non-return diaphragm 10 wherein, in this connection, a radial seal 12 for sealing relative to an inner sealing pin 13 can be integrated. The radial seal may include a plurality of radially inwardly extending bulges 12 operable to seal against a component received into the axial projection. The axial projection 11 is sized with regard to its length such that by means of it upon contacting the step 14 of the filter housing a stop is formed so that as a result of the remaining space (arrow 15) a predetermined pretension can be produced when the non-return diaphragm 10 contacts the sealing surface of the filter housing.

Figure 10:
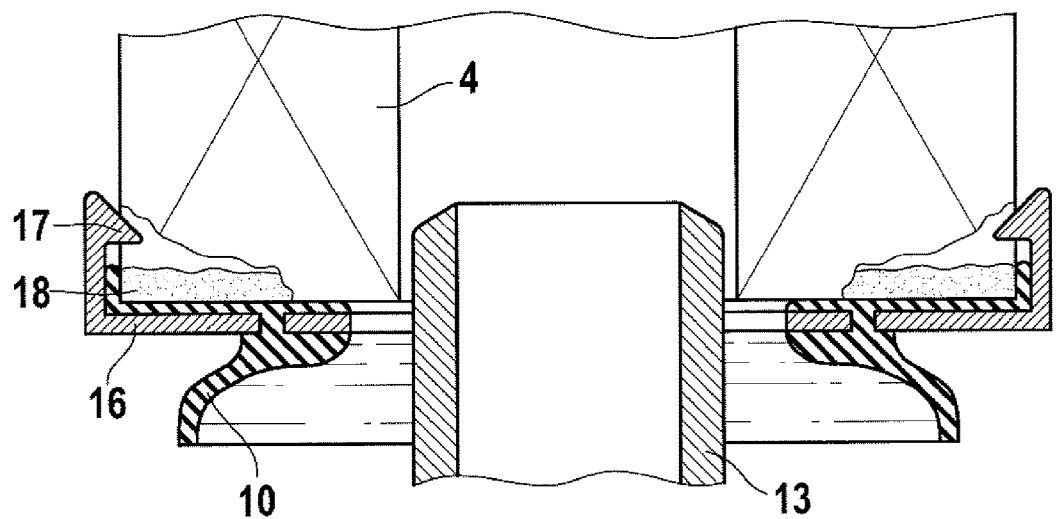
FIG. 10 an embodiment that has an end plate with a non-return diaphragm and can be attached to the filter element by means of a snap-on connection.

FIG. 10 shows an alternative embodiment of an end plate 16 as a functional carrier having on the exterior so-called snap-on noses 17 so that the non-return diaphragm 10 with the end plate 16 can be connected by means of a snap connection to the filter element 4. Upon snapping on or upon axial sliding onto the end surface of the filter element 4, the snap-on noses 17 engage laterally the intermediate spaces of the folded filter webs of the filter element 4 above an axial glued connection 18 of the filter webs and provide a detachable connection in this way.

In this connection, it is also possible to provide by injection molding elastomer extensions on the non-return diaphragm 10 radially and/or axially between the end plate 16, 17 and the filter element 4 that, for providing a sealing action, are clamped during mounting.

Figure 11:
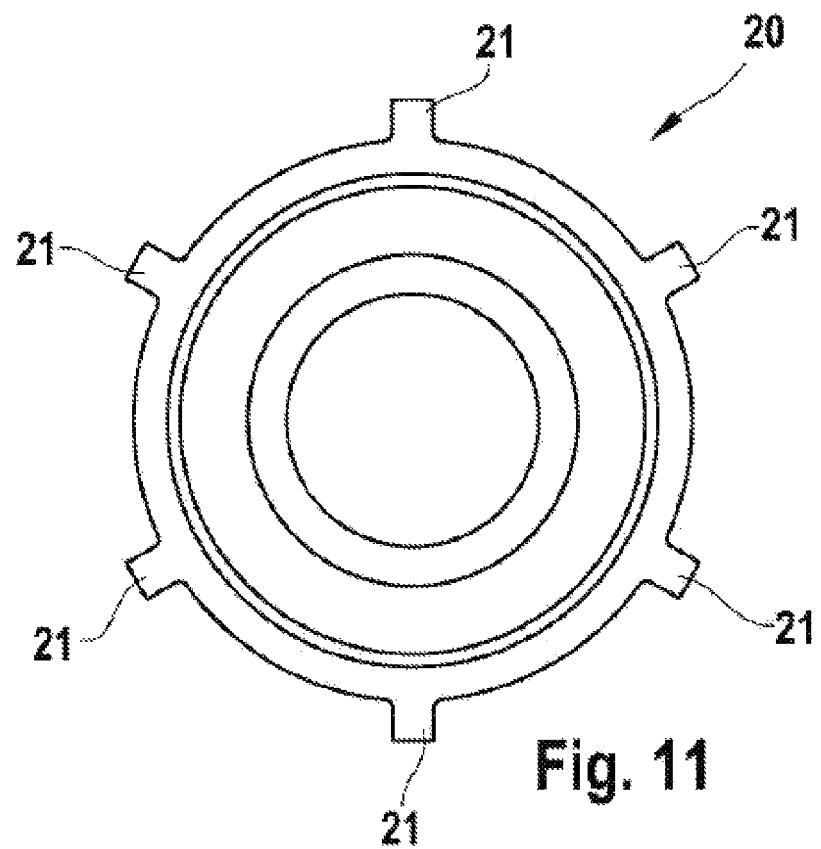
FIG. 11 a plan view of one embodiment of an end plate with radial noses.
Figure 11A:
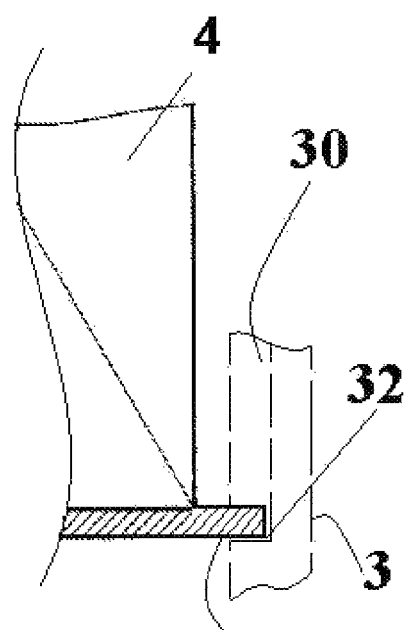

An end plate 20 according to FIGS. 11, 11A is designed such that, as a modification to the end plate 16 according to FIG. 10, radial noses 21 are provided that engage into lateral recesses 30 FIG. 11a, of the filter housing 3, as is illustrated e.g. by means of the bottom part 3 according to FIGS. 2a and 2b. The recesses 30 are formed in the housing and have an axial stop 32 formed at axial end of the recesses 30. The axial stop 32 defines a final end position of axial movement of the filter element relative to the housing during installation in the housing such that, when contacted by the radial noses 21, a stop 32 is formed so that by means of the remaining space a predetermined pretension can be produced in the non-return diaphragm when the non-return diaphragm contacts the sealing surface of the filter housing.

Figure 9A:
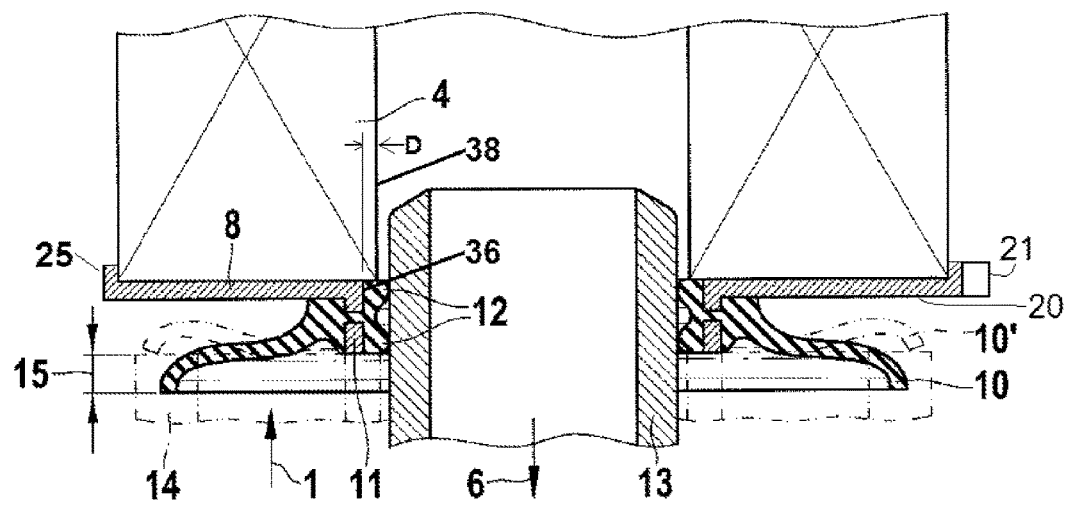

FIG. 9a is a schematic illustration of the embodiment of FIG. 9 in which the end disk according to FIGS. 11 and 11a is utilized. The radially outwardly extending radial noses 21 formed on the radial outer side of the end plate 16 as shown in FIGS. 11 and 11a. An end plate 8 (or 20) as a functional carrier a non-return diaphragm 10 can be attached to the end plate 20,8 and in particular to a tubular axial projection in the form of an axial projection 11 of the end plate 20,8. This area of the end plate 20,8 is embedded by injection-molding with an elastomer for forming the non-return diaphragm 10. The end plate 20,8 is fixedly connected to and arranged on the zigzag folded filter media 4 on an axial end face 8 of the filter element, the end plate having a central opening (substantially where pin 13 extends through the end plate) extending axially through the end plate and opening into the open central interior of the filter element and an axially extending annular rim 25 on the radially outer circumference of the end plate 20,8, the annular rim 25 having a radially inner side arranged on the radially outer flow face of the filter media 4 and having a radially outer side. The end plate 20,8 is substantially flat and extending radially in a direction substantially perpendicular to the central axis. The end plate 8 forms an axial projection 11 circumferentially surrounding the central opening in the end plate and projecting axially away from the filter element. The axial projection 11 is formed on the radially innermost edge 36 of the end plate 8. The radially innermost edge 36 of the end plate 8 as well as the axial projection 11 delimit the outer circumference of the central opening of the end plate 8. The radially innermost edge 11 of the end plate 8 as well as the axial projection 11 are spaced radially outwardly away from the radial inner flow face 38 of the filter media 4 by as distance D. The axial projection has radial openings (radial openings in 11) extending radially through an axially extending wall 11 of the axial projection 11. The non-return diaphragm is fixedly embedded into and extends radially inwardly through the radial openings of the axial projection forming on a radially inner side of the axially extending wall a seal operable to seal against a filter housing component, for example, inner sealing pin 13. The end plate has a plurality of radially outwardly extending radial noses 21 formed directly on the radially outer side of annular rim at a radially outer circumference of the end plate and projecting radially outwardly away from the end disk 20,8. The radial noses may be angularly spaced apart radially on the outer circumference of the end plate, the radially outwardly extending noses operable to engage into recesses provided in an interior of a filter housing to provide an axial stop of the filter element so that as a result of the remaining space (arrow 15) a predetermined pretension can be produced when the non-return diaphragm 10 contacts the sealing surface of the filter housing. The housing may include a step 14 (as in FIG. 9). The axial projection 11 may be sized with regard to its length such that by means of it upon contacting the step 14 of the filter housing an axial stop is formed so that as a result of the remaining space (arrow 15) a predetermined pretension can be produced when the non-return diaphragm 10 contacts the sealing surface of the filter housing.

TECHNICAL UTILITY

The invention is, for example, usable in automotive technology, in particular in filter arrangements for liquids, in particular for oil or fuel.

The invention claimed is:

1. A filter arrangement for filtering liquids, the filter arrangement comprising:
    a filter housing;
    a filter element arranged within the filter housing, the filter element comprising:
        a cylindrical filter element of zigzag folded filter media in a cylindrical shape around a central axis, the filter element having an open interior extending axially on the central axis, wherein the zig-zag folded filter media includes:
            a first axial end face;
            an opposing second axial end face;
            a radially inner flow face arranged at and circumferentially surrounding the open interior and the central axis, the radially inner flow face extending between the first and second axial end faces; and
            a radially outer flow face arranged at and circumferentially surrounding the radial outer side of the cylindrical shaped filter media and circumferentially surrounding the radially inner flow face, the radially outer flow face extending between the first and second axial end faces;
        wherein one of the inner and outer flow faces is an unfiltered flow face through which unfiltered liquid enters the filter element;
        wherein a different one of the inner and outer flow faces is an filtered flow face through which filtered liquid leaves the filter element;
        a first end plate that is flat and circular, the first end plate lying directly on and closing directly against the zigzag folded filter media across the first axial end face from proximate to the radial inner flow face of the filter media to the radial outer flow face of the filter media, such that the first axial end face of the zigzag folded filter media is in direct contact with and fixed directly onto the first end plate;
        wherein a radially innermost edge of the first end plate is arranged on the first axial end face of the filter media of the cylindrical filter element and spaced radially outwardly away from the radial inner flow face of the filter media;
        wherein the first end plate is substantially flat and extending radially in a direction substantially perpendicular to the central axis, the first end plate having:
            a central opening extending axially through the first end plate and opening into the radially inner flow face at the open central interior of the filter element;
            an axial projection formed as an annular wall having a first end positioned on an outer circumference of the central opening and surrounding the central opening, the axial projection having an opposite second axial end arranged axially outwardly away from the first end plate and filter media;
            an annular rim formed on a radially outer circumference of the first end plate, the annular rim having:
                a radially inner side arranged on the radially outer flow face of the filter media; and
                a radially outer side;
                wherein the annular rim projects axially from the first end plate in a direction towards the opposing second axial end face of the filter media; and
            an annular non-return diaphragm comprised of an elastomer and secured onto the axial projection in such a way that the non-return diaphragm is operable to sealably contact a sealing surface of the filter housing, with the non-return diaphragm elastically deflectable/flexible within predetermined limits in an axial direction of the filter element,
                wherein the non-return diaphragm extends radially through openings of the axial projection from a radially outer side to a radially inner side of the annular wall to form a radial seal at the radial inner side of the annular wall,
                wherein the radial seal adapted to seal radially against a filter housing component when the filter housing component is received into the axial projection;
        wherein the first end plate includes:
            a plurality of radial noses formed directly on the radially outer side of the annular rim and projecting radially outwardly away from the annular rim and the filter media, the plurality of radial noses angularly spaced apart on an outer circumference of the annular rim,
            the plurality of radial noses configured to project onto and abut axially against respective ones of a plurality of axial stops formed on a radially inner surface of the filter housing,
            the radial noses configured to engage into the plurality of axial stops forming an axial stop of the filter element in the filter housing; and
        a plurality of axial stops formed on a radially inner surface of the filter housing, the plurality of axial stops angularly spaced apart on the radially inner surface of the filter housing;
        wherein the plurality of radial noses project radially outwardly onto and abut axially against respective ones of the plurality of axial stops of the filter housing, the plurality of axial stops defining a predetermined pretension of the non-return diaphragm when the non-return diaphragm is resting against a sealing surface of the filter housing.

2. The filter arrangement according to claim 1, wherein: the radial seal formed by the non-return diaphragm, on the radially inner side of said annular wall of said axial projection, includes at least one radially inwardly projecting bulge operable to seal radially against the filter housing component received into the axial projection.

3. The lifter arrangement according to claim 2, wherein: the radial seal formed by the non-return diaphragm has two radially inwardly projecting bulges, the bulges spaced apart axially on the radially inner side of said annular wall of said axial projection and separated by an annular groove.

* * * * *